United States Patent
Geisler et al.

(10) Patent No.: US 11,993,216 B2
(45) Date of Patent: May 28, 2024

(54) OCCUPANT PROTECTION DEVICE FOR A VEHICLE

(71) Applicant: MERCEDES-BENZ GROUP AG, Stuttgart (DE)

(72) Inventors: Claus Geisler, Herrenberg (DE); Juergen Warwel, Stuttgart (DE); Abdulkadir Oeztuerk, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/781,790

(22) PCT Filed: Dec. 9, 2020

(86) PCT No.: PCT/EP2020/085321
§ 371 (c)(1),
(2) Date: Jun. 2, 2022

(87) PCT Pub. No.: WO2021/122235
PCT Pub. Date: Jun. 24, 2021

(65) Prior Publication Data
US 2023/0008770 A1 Jan. 12, 2023

(30) Foreign Application Priority Data
Dec. 19, 2019 (DE) .................. 10 2019 008 850.6

(51) Int. Cl.
*B60R 21/207* (2006.01)
*B60R 21/231* (2011.01)

(52) U.S. Cl.
CPC .......... *B60R 21/207* (2013.01); *B60R 21/231* (2013.01); *B60R 2021/23107* (2013.01); *B60R 2021/23146* (2013.01); *B60R 2021/23153* (2013.01)

(58) Field of Classification Search
CPC ................ B60R 21/207; B60R 21/231; B60R 2021/23146; B60R 2021/23107; B60R 2021/23153
(Continued)

(56) References Cited

U.S. PATENT DOCUMENTS 6,286,860 B1 * 9/2001 Adomeit ................. B60R 21/18
280/733
6,422,512 B1 * 7/2002 Lewis ..................... B64D 25/02
244/122 AG
(Continued)

FOREIGN PATENT DOCUMENTS

| CN | 1865046 A | 11/2006 |
|---|---|---|
| CN | 102029966 A | 4/2011 |

(Continued)

OTHER PUBLICATIONS

International Search Report dated Feb. 8, 2021 in related/corresponding International Application No. PCT/EP2020/085321.
(Continued)

*Primary Examiner* — Keith J Frisby
(74) *Attorney, Agent, or Firm* — PATENT PORTFOLIO BUILDERS PLLC

(57) ABSTRACT

An occupant protection device for a vehicle includes an airbag arranged in a region of a vehicle seat, that inflates from this region, and is allocated to an occupant in the vehicle seat. The airbag inflates upwards in the direction of a vehicle vertical axis, has a balloon-shaped section and adjacent thereto a further section and is positioned, in its operative position, in such a manner that the airbag encloses legs and a lower body of the occupant and this enclosing region forms an impact and support region for a head and an upper body of the occupant.

9 Claims, 2 Drawing Sheets

Figure 1:
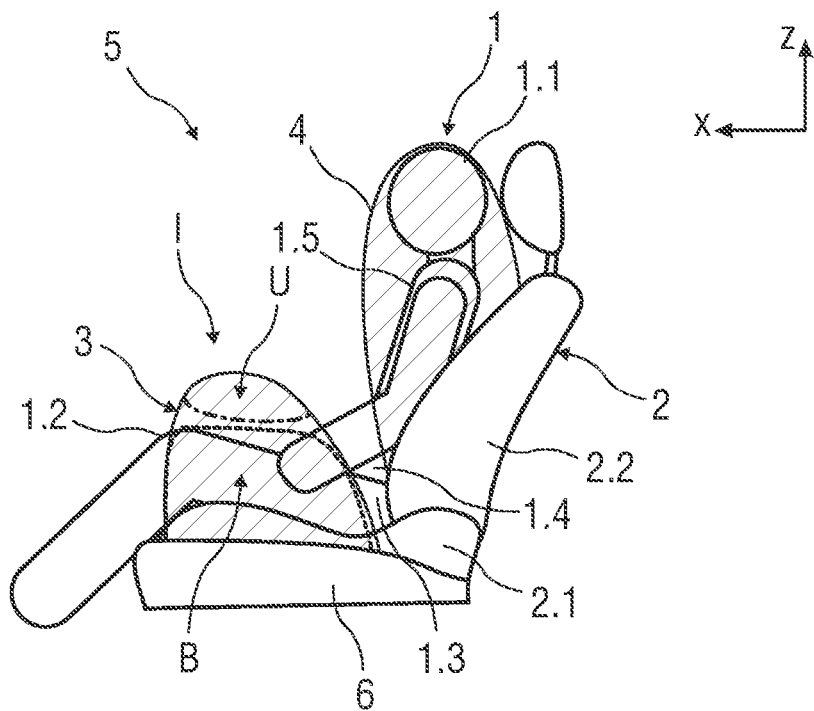

(58) Field of Classification Search
 USPC .............................. 280/730.1, 730.2, 743.1
 See application file for complete search history.

(56) References Cited

U.S. PATENT DOCUMENTS

| | | | |
|---|---|---|---|
| 8,434,784 | B2 | 5/2013 | Honda et al. |
| 9,896,056 | B2 | 2/2018 | Burczyk et al. |
| 10,053,045 | B2 | 8/2018 | Weiss et al. |
| 2011/0074136 | A1 | 3/2011 | Honda et al. |
| 2015/0069741 | A1 | 3/2015 | Shimazu |
| 2016/0082915 | A1* | 3/2016 | Madaras ................ B60R 21/013 297/216.19 |
| 2017/0247006 | A1 | 8/2017 | Rao et al. |
| 2017/0291566 | A1 | 10/2017 | Karlow et al. |
| 2018/0086299 | A1 | 3/2018 | Kalinowski |
| 2019/0299903 | A1 | 10/2019 | Nagasawa |
| 2019/0299917 | A1 | 10/2019 | Nagasawa |
| 2019/0389414 | A1* | 12/2019 | Masuda ................ B60R 21/207 |

FOREIGN PATENT DOCUMENTS

| | | |
|---|---|---|
| CN | 104228746 A | 12/2014 |
| CN | 104417478 A | 3/2015 |
| CN | 105539352 B | 3/2018 |
| CN | 110316139 A | 10/2019 |
| CN | 110329201 A | 10/2019 |
| DE | 19725558 A1 | 12/1998 |
| DE | 10105561 A1 | 8/2002 |
| DE | 102009016885 A1 | 10/2010 |
| DE | 102013017346 A1 | 7/2014 |
| DE | 102014001952 A1 | 8/2015 |
| DE | 102014006862 A1 | 11/2015 |
| DE | 102014214396 A1 | 1/2016 |
| DE | 102014226745 A1 | 6/2016 |
| DE | 102017131140 A1 | 6/2019 |
| EP | 3187379 A1 | 7/2017 |
| JP | 2019034675 A | 3/2019 |
| KR | 20080080968 A | 9/2008 |

OTHER PUBLICATIONS

Office Action dated Apr. 23, 2021 in related/corresponding DE Application No. 10 2019 008 850.6.
Written Opinion dated Feb. 8, 2021 in related/corresponding International Application No. PCT/EP2020/085321.
Office Action dated Mar. 1, 2024 in related/corresponding CN Application No. 202080087403.8.

* cited by examiner

OCCUPANT PROTECTION DEVICE FOR A VEHICLE

BACKGROUND AND SUMMARY OF THE INVENTION

Exemplary embodiments of the invention relate to an occupant protection device for a vehicle, the occupant protection device at least comprising an airbag arranged in a region of a vehicle seat, that inflates from the region, and is allocated to an occupant in the vehicle seat.

A vehicle having at least one airbag arranged in the rear region is known from DE 10 2013 017 346 A1. The at least one airbag is arranged in the region of a seat cushion forming a seat surface of a rear seat such that the airbag can be inflated in the direction of the vehicle vertical axis.

EP 3 187 379 A1 also describes an airbag arranged in an armrest of a vehicle seat and that inflates from the latter, whereas US 2018/0086299 A1 and DE 10 2009 016 885 A1 each disclose an airbag arranged in a seat backrest, in particular in a side bolster of the seat backrest.

Exemplary embodiments of the invention are directed to providing an occupant protection device for a vehicle which is an improvement on the prior art.

An occupant protection device for a vehicle at least comprises an airbag that is arranged in a region of a vehicle seat and inflates from the region and is allocated to an occupant in the vehicle seat. According to the invention, the airbag inflates upwards in the direction of a vehicle vertical axis, wherein the airbag has a balloon-shaped section and adjacent thereto a further section and is positioned, in its operative position, in such a manner that the airbag encloses legs and a lower body of the occupant and this enclosing region forms an impact and support region for a head and an upper body of the occupant.

By means of an airbag configured in this way, occupant protection in the event of a frontal impact of the vehicle can be optimized, wherein the airbag constitutes a supplement to the wearing of a seatbelt.

Since the airbag is arranged in the region of the vehicle seat, in particular in the vehicle seat, there is no need to use any construction space in a dashboard or in a steering wheel from which the airbag inflates.

In particular, the occupant protection device with the airbag is suitable for occupants in vehicle seats in rear seating positions and/or in a row of seats in the rear of the vehicle, for example for what is referred to as a face-to-face seating arrangement in which substantially no optimized protective effect can be achieved by an airbag inflating from the dashboard or the steering wheel.

In one embodiment, the airbag has a plurality of support regions, wherein one support region is arranged or configured in the region of its arrangement on the vehicle seat and a further support region is arranged or configured in the region of the legs of the occupant. The airbag supports itself by means of the support regions, so the stability of the airbag and any protective effect achieved thereby can be optimized.

In one embodiment, the airbag has a recess in the balloon-shaped section provided to receive the upper body of the occupant when the airbag is positioned into its operative position. The recess is arranged on a side of the balloon-shaped section facing towards a seat backrest, wherein, by means of the recess, the occupant can as far as possible be prevented from being pinned by the positioning airbag and/or from being injured by the airbag when it inflates.

In one development, the airbag is configured in two parts and one respective subsection inflates upwards from a lateral region of the vehicle seat in the direction of the vehicle vertical axis, wherein the two subsections are arranged opposite one another to the side of the vehicle seat. If the two subsections are positioned in their operative position, the occupant is supported in the vehicle seat on both sides.

In a further embodiment, each subsection has a balloon-shaped section and a further section here, wherein the enclosing region is formed from both subsections of the airbag. The occupant is therefore located between the two subsections and is supported by means of these to the front and side in order at least considerably to reduce any risk of injury to the occupant.

One configuration of the occupant protection device provides for the latter additionally to comprise at least one further airbag inflating laterally from a seat backrest of the vehicle seat. By means of the at least one further airbag inflating laterally from the seat backrest, the occupant is additionally supported laterally, wherein, by means of the further airbag, the occupant, for example, is spaced apart from a lateral vehicle part so that the occupant can as far as possible be prevented from impacting on the lateral vehicle part.

In order to position the airbag, the parts and/or the further airbag into the respective operative position, in a further embodiment of the occupant protection device, a plurality of gas generators is provided, wherein in each case at least one gas generator is fluidically coupled to at least one airbag or part of the airbag. In particular, a gas generator is in each case allocated to an airbag or in each case to a part of the airbag so that the airbags and the respective part of the airbag can be filled comparatively quickly and take up their operative position in order to optimize the protective effect for the occupant.

In one possible development, the plurality of gas generators is integrated into the vehicle seat so that there is no need to cover the relatively large distances between the airbag, the subsections, and the further airbag. The occupant protection device is thereby designed to be comparatively compact.

In a further embodiment, the vehicle seat is pivoted about an axis of rotation running parallel to the vehicle vertical axis so that it is possible, for example, for the vehicle seat to be positioned in the vehicle such that the occupant can talk to a further occupant face-to-face in the vehicle.

BRIEF DESCRIPTION OF THE DRAWING FIGURES

Exemplary embodiments of the invention are described in more detail below by reference to the drawings.

Figure 2:
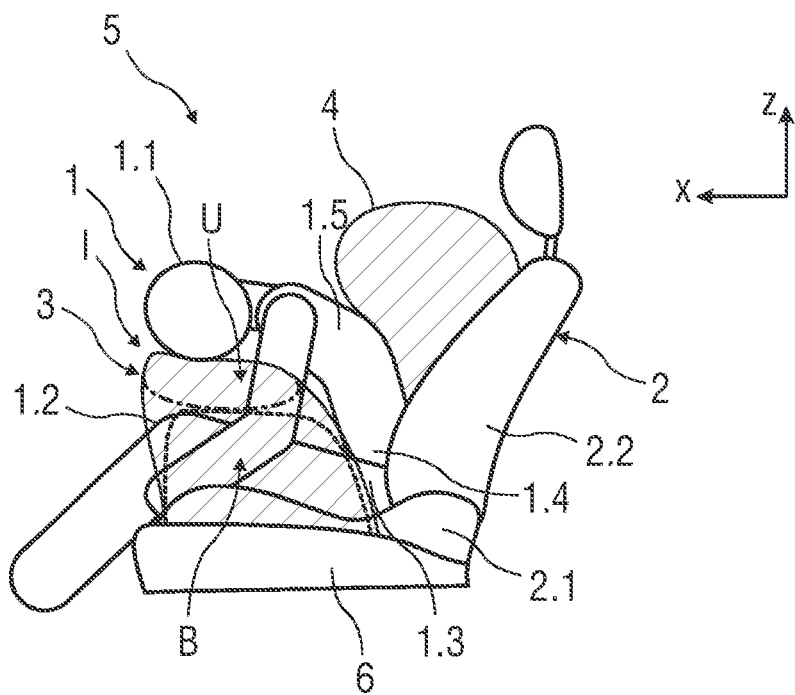
Figure 3:
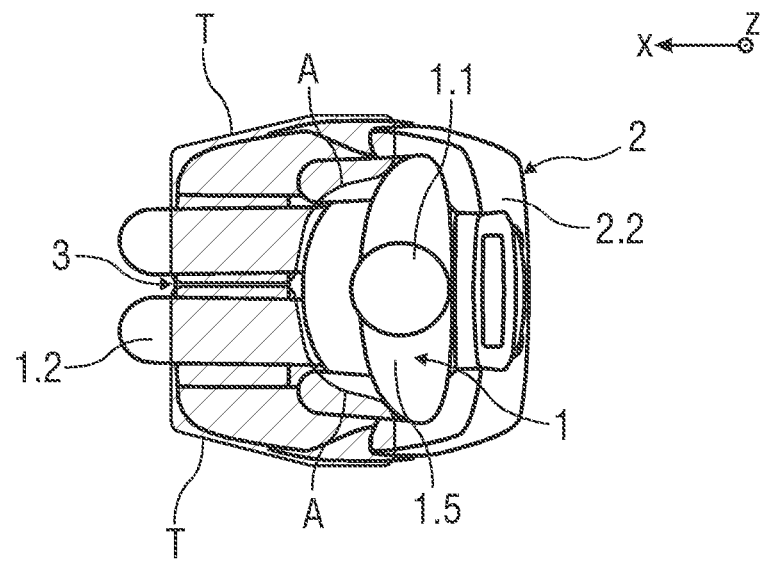
Figure 4:
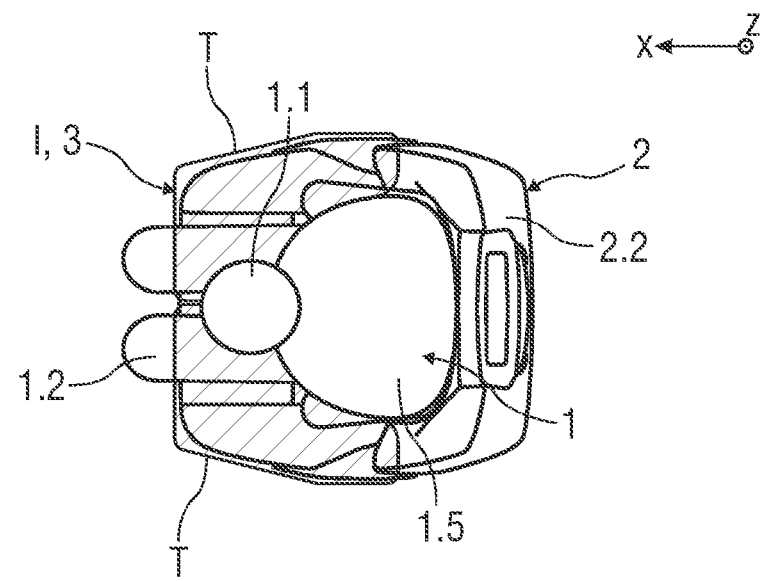

In the Figures:

FIG. 1 schematically shows a side view of a vehicle seat with an occupant and a triggered occupant protection device in one embodiment, FIG. 2 schematically shows a side view of the vehicle seat with the occupant accelerated as a result of a collision and the triggered occupant protection device in the embodiment according to FIG. 1, FIG. 3 schematically shows a plan view of a vehicle seat with an occupant and the triggered occupant protection device in a further embodiment, and FIG. 4 schematically shows a plan view of the vehicle with the occupant accelerated as a result of a collision and the triggered occupant protection device in the further embodiment.

DETAILED DESCRIPTION

Parts corresponding to one another have been provided with the same reference numerals in all of the figures.

FIGS. 1 and 2 each show a side view of an occupant 1 in a vehicle seat 2 with a triggered occupant protection device I, which comprises an airbag 3 and a further airbag 4.

A vehicle 5 in which the vehicle seat 2 is arranged has an assistance system for autonomous vehicle operation, wherein a driving task is carried out entirely by the vehicle 5.

An occupant 1 of the vehicle 5 who usually carries out the driving task can therefore pursue other activities. For example, the occupant 1 can talk to a further occupant (not described in any further detail) who, for example, is sitting in the rear region of the vehicle 5.

In order to be able to talk fact-to-face, the vehicle seat 2 is pivoted about an axis of rotation running parallel to the vehicle vertical axis z so that the vehicle seat 2 can be positioned in the direction of the rear region.

In such a position, the occupant 1 is not optimally aligned with respect to a frontal airbag integrated into a steering wheel or a dashboard, which respectively inflates from the steering wheel or the dashboard. A protective effect of the frontal airbag therefore cannot be ensured for the occupant 1, wherein the occupant 1 cannot be restrained by means of the frontal airbag.

In the event of a collision of the vehicle 5, such circumstances may lead to the head 1.1 of the occupant 1 contacting their knees 1.2 and/or legs 1.3 due to the effect of the acceleration, as a result of which a comparatively large amount of stress is placed, in particular, on the head 1.1 and a cervical spine of the occupant 1 (not shown in any further detail).

The occupant protection device I described below is provided in order to at least reduce the risk of injury to the occupant 1 in such a situation. According to the present exemplary embodiment, the vehicle seat 2 is a vehicle seat 2 in a rear region of the vehicle 5, wherein the vehicle seat 2 is positioned forwards in the longitudinal direction of the vehicle x, that is to say in the direction of travel of the vehicle 5.

In one embodiment, the occupant protection device I comprises the two airbags 3, 4, wherein the airbag 3 is arranged directly on the vehicle seat 2 in a lower region, for example in a console 6, and, in the event of a collision of the vehicle 5, inflates from the latter and takes up its operative position shown in FIGS. 1 and 2. In particular, the lower region is to be understood as meaning the region arranged underneath a seat cushion 2.1 forming a seat surface of the vehicle seat 2.

It is also conceivable for the airbag 3 to be arranged in a side armrest (not shown in any further detail), in the region of a moveable central console or another interior component attached to the seat and moveable, and for it to inflate from there.

In the operative position of the airbag 3, the latter extends progressively over the legs 1.3 and around a lower body 1.4 of the occupant 1, wherein the airbag 3 inflates upwards from the console 6 in the direction of a vehicle vertical axis z and, on account of its shape, extends over the occupant 1.

By means of the airbag 3 positioned into the operative position, the occupant 1 is held in the vehicle seat 2, wherein the occupant 1 is also laterally supported by means of the airbag 3 on the side on which the airbag 3 inflates from the console 6.

If the occupant 1 is accelerated forwards as a result of a collision, in particular a frontal collision, in the direction of the vehicle longitudinal axis x, the occupant 1 impacts with their head 1.1 on an enclosing region U of the airbag 3, wherein an upper body 1.5 is supported by means of the enclosing region U.

To configure the enclosing region U, the airbag 3 has a recess A shown in a similar way in FIG. 3 serving to receive the lower body 1.4 and part of the upper body 1.5 of the occupant 1. For this purpose, an opening of the recess A is arranged in the direction of the occupant 1 and therefore in the direction of a seat backrest 2.2.

By means of the recess A, the occupant 1 is also as far as possible prevented from being pinned between the airbag 3 and the seat backrest 2.2 and/or from being injured when the airbag 3 inflates.

The airbag 3 is designed to be rather flat in the direction of the legs 1.3, wherein the enclosing region U adjacent thereto with the recess A is configured to be balloon-shaped.

Alternatively, a region of the airbag 3 arranged in the section of the legs 1.3 can be configured to be cylindrical or tubular, it being necessary here to ensure the supporting effect of the airbag 3 on the legs 1.3 and for this section to form a catchment surface for the head 1.1 and the upper body 1.5 of the occupant 1.

The airbag 3 also has a lateral supporting region B for the lateral holding of the occupant 1 in the vehicle seat 2.

The airbag 3 can be configured to be longer in a lower section in order to support the occupant 1 laterally, wherein an upper section for covering the legs 1.3 and which has the recess A is configured to be shorter.

The occupant protection device I also comprises the further airbag 4 inflating laterally from the seat backrest 2.2, in particular from a side bolster, wherein a further airbag 4 of this kind can also be arranged on an opposite side of the seat backrest 2.2. By means of the further airbag 4 or by means of the further airbags 4, the occupant 1 is supported in the vehicle seat 2 on both sides so that any risk of impact on a vehicle component on either side of the vehicle seat 2 can as far as possible be prevented. In particular, the further airbag 4 serves to improve a side retention of the occupant 1, in particular of their upper body 1.5, in the vehicle seat 2.

Gas generators which are required to fill the airbags 3, 4 and which are triggered in the event of a detected imminent collision of the vehicle 5 or in the event of a detected collision, are integrated into the vehicle seat 2, for example into the console 6, wherein at least one gas generator is fluidically connected to in each case one of the airbags 3, 4.

FIGS. 3 and 4 show a further embodiment of the occupant protection device I, wherein the airbag 3 is configured in two parts and comprises two substantially symmetrically configured subsections T which are arranged opposite one another on the vehicle seat 2.

By means of this airbag 3 configured in two parts, the occupant 1 is supported on both sides of the vehicle seat 2 in the event of a collision of the vehicle 5 and is therefore spaced apart from any lateral vehicle parts or also from any adjacent vehicle seat 2.

In the operative position of the airbag 3 achieved by means of the two subsections T, an enclosing region U is likewise formed for the occupant 1, half of the recess A being configured to receive the occupant 1 in the respective subsection T.

In the further embodiment too, in the event of a collision of the vehicle 5, as a result of the acceleration the occupant 1 impacts with their head 1.1 on the enclosing region U by means of which collision energy is absorbed and any risk of injury to the occupant 1 is thereby reduced.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS

1 Occupant
1.1 Head
1.2 Knee
1.3 Leg
1.4 Lower body
1.5 Upper body
2 Vehicle seat
2.1 Seat cushion
2.2 Seat backrest
3 Airbag
4 Further airbag
5 Vehicle
6 Console
A Recess
B Supporting region
I Occupant protection device
T Subsections
U Enclosing region
x Vehicle longitudinal axis
z Vehicle vertical axis

The invention claimed is:

1. An occupant protection device for a vehicle, the occupant protection device comprising:
    an airbag arranged directly on a vehicle seat and in a region underneath a seat cushion of the vehicle seat, wherein the airbag is configured to inflate from the region of the vehicle seat, and wherein the airbag is arranged to protect an occupant in the vehicle seat,
    wherein the airbag is configured to inflate upwards in a direction of a vertical axis of the vehicle,
    wherein the airbag is configured, in an operative position of the airbag, in such a manner that the airbag encloses legs and a lower body of the occupant in an enclosing region forming an impact and support region for a head and an upper body of the occupant,
    wherein the airbag comprises a lateral supporting region configured to laterally hold the occupant in the vehicle seat,
    wherein, in the operative position of the airbag, a bottom side of the airbag facing the legs of the occupant is curved and a top side of the airbag is more curved than the bottom side of the airbag facing the legs of the occupant,
    wherein, in the operative position of the airbag, the airbag has a recess configured to receive the upper body of the occupant, and
    wherein, in the operative position of the airbag, a lower section of the airbag is longer in an occupant facing direction than an upper section of the airbag.

2. The occupant protection device of claim 1, wherein the airbag has a plurality of support regions, wherein one of the plurality of support regions is arranged in a region of the one of the plurality of support regions arrangement on the vehicle seat and a second one of the plurality of support regions is arranged in a region of the legs of the occupant.

3. The occupant protection device of claim 1, wherein the airbag is configured in two subsections respectively arranged on opposite sides of the vehicle seat, wherein each of the two subsections is configured to inflate upwards from a respective lateral region of the vehicle seat in the direction of the vehicle vertical axis of the vehicle.

4. The occupant protection device of claim 3, wherein each of the two subsections has a first section and a further section, wherein the enclosing region is formed from both of the two subsections of the airbag.

5. The occupant protection device of claim 1, further comprising:
    at least one further airbag configured to inflate laterally from a seat backrest of the vehicle seat and configured, in an inflated state, to support the upper body.

6. The occupant protection device of claim 5, further comprising:
    a plurality of gas generators, wherein a respective one of the plurality of gas generators is fluidically coupled to the airbag and further airbag or to a subsection of the airbag.

7. The occupant protection device of claim 6, wherein the plurality of gas generators is integrated into the vehicle seat.

8. The occupant protection device of claim 1, wherein the vehicle seat is pivotable about an axis of rotation running parallel to the vertical axis of the vehicle.

9. A vehicle seat, comprising:
    an occupant protection device for a vehicle, which comprises an airbag arranged directly on the vehicle seat and stored in a console underneath a seat cushion of the vehicle seat, wherein the airbag is configured to inflate from the console, and wherein the airbag is arranged to protect an occupant in the vehicle seat,
    wherein the airbag is configured to inflate upwards in a direction of a vertical axis of the vehicle,
    wherein the airbag is configured, in an operative position of the airbag, in such a manner that the airbag encloses legs and a lower body of the occupant in an enclosing region forming an impact and support region for a head and an upper body of the occupant,
    wherein the airbag comprises a lateral supporting region configured to laterally hold the occupant in the vehicle seat,
    wherein, in the operative position of the airbag, a bottom side of the airbag facing the legs of the occupant is curved and a top side of the airbag is more curved than the bottom side of the airbag facing the legs of the occupant,
    wherein, in the operative position of the airbag, the airbag has a recess configured to receive the upper body of the occupant, and
    wherein, in the operative position of the airbag, a lower section of the airbag is longer in an occupant facing direction than an upper section of the airbag.

* * * * *